(No Model.)
P. E. HALL, Sr.
PLUMBER'S ADJUSTABLE BRACKET.
No. 410,414. Patented Sept. 3, 1889.
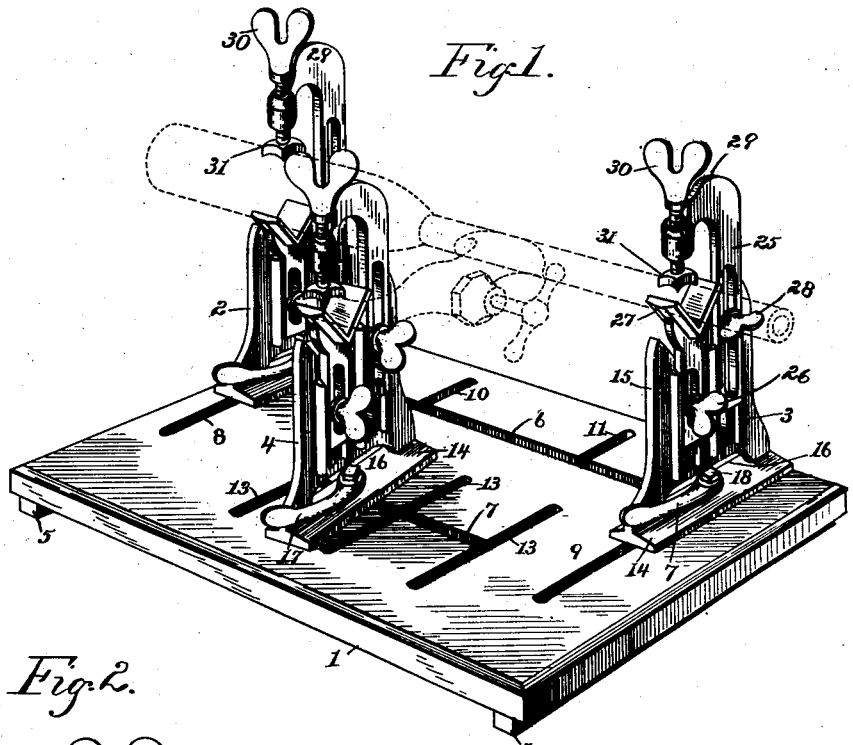
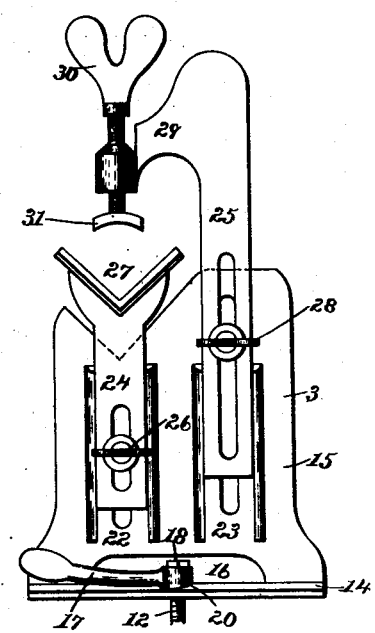
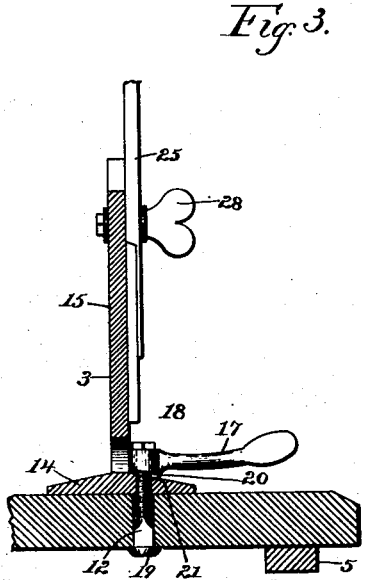
Witnesses:
Percy C. Bowen
William O. Belt
Inventor:
Perry E. Hall, Sr.
By Edson Bros,
Attorneys.

UNITED STATES PATENT OFFICE.

PERRY E. HALL, SR., OF ASHTABULA, OHIO.

PLUMBER'S ADJUSTABLE BRACKET.

SPECIFICATION forming part of Letters Patent No. 410,414, dated September 3, 1889.

Application filed June 19, 1889. Serial No. 314,852. (No model.)

*To all whom it may concern:*

Be it known that I, PERRY E. HALL, SR., a citizen of the United States, residing at Ashtabula, in the county of Ashtabula and State of Ohio, have invented certain new and useful Improvements in Plumbers' Universal Adjustable Brackets; and I do hereby declare the following to be a full, clear, and exact description of the invention, such as will enable others skilled in the art to which it appertains to make and use the same.

My invention relates to a universal adjustable bracket especially adapted for use by plumbers to hold pipes of various different angles while wiping the joints thereof, which will be hereinafter fully described and claimed.

The method of holding a pipe ordinarily practiced by plumbers in wiping the joint is to "block up" the same by bricks and other objects which may be at hand, and apply pipe-tongs, monkey-wrenches, or other tools or other objects to the pipe in order to hold them rigidly in place; but this method is objectionable, not only because of the time and labor involved, but the pipes ofttimes get out of alignment, which fact is not discovered until after the work is completed, which results in spoiling the work and material. I aim to overcome these objections and to provide a device which will firmly and rigidly hold the pipe while the work is being performed thereon, which can be expeditiously adjusted to accommodate itself to pipes of any bend or angle, and which shall be light, strong, and durable in construction, readily carried or transported, not liable to get out of order, and cheap of manufacture.

With these ends in view and such others as pertain to my invention I employ a base-board and a set of brackets, preferably three in number, which are adjustably connected to said board in such a manner that they can be moved to positions which accommodate the angles or bends in the pipe. I preferably arrange two of the brackets at or near opposite ends of the base-board, and these brackets have bolts which pass through slots in the base-board, the slots being so arranged that the end brackets can be adjusted in line with each or moved toward each other when so aligned, or they can be independently adjusted out of line with one another. The remaining third bracket of the set is arranged on the base-board at a point intermediate between the end brackets, and it is adjustable on the base-board both longitudinally and transversely of the same, so that the position of the intermediate bracket with relation to the two end brackets can be varied. Each bracket is fastened in place by means of a clamp-lever that works on the bolt of the bracket and has a cam-surface which binds against a corresponding surface or depression formed in the base of said bracket, whereby the lever can be easily and readily operated to release the bracket or bind the same firmly in place. Each bracket is formed with two vertical guideways, in one of which is fitted a vertically-adjustable rest and in the other a vertically-adjustable clamp, which overhangs the jaw of the rest and is adapted to firmly grip and hold the work between itself and said rest, the clamp and rest being adjustable independently of each other, and each being firmly held in position by a binding-screw which works in a threaded socket in the bracket and passes through a slot in the shank of the rest and clamp, as is obvious. The clamp is further provided in its overhanging end with a thumb-screw which carries a binding-plate, whereby said screw and plate are adapted to be firmly forced against the work by a simple turn of the screw after the clamp proper has been adjusted to the proper position.

To enable others to more readily understand my invention, I will now proceed to a detailed description thereof in connection with the accompanying drawings, in which—

Figure 1 is a perspective view showing in dotted lines a pipe held in a plumber's universal adjustable bracket constructed in accordance with my invention. Fig. 2 is an enlarged detail view of one of the brackets, and Fig. 3 is a view partly in elevation and in section on a vertical plane through the base-board and the base of one of the brackets.

Like numerals of reference denote corresponding parts in all the figures, referring to which—

1 designates a horizontal base-board of suitable dimensions to receive and sustain a set of adjustable brackets, 2, 3, and 4, which are adapted to be moved to various positions on said board to accommodate themselves to the various angles of pipe and hold the same firmly in position while wiping the joints thereof. This base-board is provided with transverse battens 5, which are suitably fixed to the under side of the board at or near the ends thereof, and which serve the twofold purpose of strengthening the board and of elevating the same above the surface on which it may be placed to provide for the free movement of the heads of the bolts that connect the adjustable brackets to the base-board, as will more fully appear presently. This base-board is provided with two longitudinal slots, 6 7, one of which 6 is longer than the other 7, the longer slot 6 being located near one edge of the board and extending nearly the entire length thereof, while the shorter lot is arranged a suitable distance at one side of and parallel with the longer slot, as clearly shown in Fig. 1. The longer slot 6 has its ends opening into transverse slots 8 9, formed near the ends of the board, and with the long slot communicate shorter transverse slots 10 11, which are located at suitable intervals between the transverse slots 8 9 and between one side edge of the board and the longer longitudinal slot. The longitudinal slot 6 and its intersecting transverse slots 8 to 11, inclusive, receive the securing-bolts 12 of two of the set of three brackets—namely, the two end brackets 2 3—while the shorter longitudinal slot 7 receives the bolt 12 of the intermediate bracket 4 of the set of brackets, and this intermediate bracket 4 is adjustable longitudinally on the base-board in the slot 7, and it is also adjustable transversely on the base-board in either of series of transverse slots 13, which intersect the shorter longitudinal slot 7, as is obvious.

Each bracket has a flat horizontal base 14, which rests firmly on the base-board, and with this base is cast the integral vertical shank or standard 15 of the bracket, a horizontal slot or space 16 being preferably made at the middle of the shank or standard and between the lower end of the shank and base, in order to provide for the proper connection and manipulation of the clamp-lever 17. This lever turns or is pivoted on the upper end of the bolt 12, which passes through the base of the bracket and the slot in the base-board, and one side or face of the lever rides or bears against a nut 18, which is fixed on the upper end of the bolt 12, while the lower end of the bolt is furnished with a head 19, which impinges against the lower face of the base-board, the diameter of the bolt-head being greater than the width of the slot to prevent said bolt from being drawn through the slot. This clamp-lever has its head formed with an oblique or cam surface 20, which impinges against an inclined surface or socket 21, formed on the base of the bracket, and these surfaces are mutually disposed to cause the lever to release the strain on the bolt when said lever lies at right angles to the bracket; but when this lever is turned to a position parallel with the bracket these cam-surfaces cause the lever to elevate the bolt and thus bring its head forcibly against the base-board, whereby the base of the bracket is drawn firmly upon the base-board and the bracket held steadily and securely in position.

The shank or standard of each bracket is provided with two vertical parallel ways 22 and 23, which are preferably formed by casting flanges on one face thereof, although I do not restrict myself to this particular form of way; and in the way 22 I place a vertically-adjustable pipe-rest 24, while in the other way 23 a vertically-adjustable clamp 25 is fitted. The pipe-rest has a shank which is slotted longitudinally to receive a binding-screw 26, which works in a threaded aperture in the shank or standard of the bracket, and the upper end of said pipe-rest has a rigid jaw 27, preferably of V shape, into which the pipe or other work is fitted.

The vertically-adjustable clamp 25, which is arranged in the guideway at one side of the pipe-rest, is furnished with a vertically-slotted shank to receive a set-screw 28, that works in a threaded aperture in the standard of the bracket, and the upper end of said clamp is bent or curved upon itself to form an overhanging arm 29, which normally lies immediately over the rigid V-shaped jaw of the pipe-rest, so that when said rest and clamp are properly adjusted in relation to each other they will operate to hold the work in a firmly-fixed position between themselves. In this overhanging end of the clamp I provide a threaded aperture, in which works an adjusting-screw 30, and to the lower end of this screw is connected or swiveled a binding-plate 31, that is curved to fit the convex surfaces of the pipes which are to be held by the device.

The operation of my invention is obvious. The brackets are released by turning the clamp-levers at right angles to the base of said brackets, after which they are adjusted or moved in the slots of the base-board into such relative positions as to accommodate the angle of the pipe. In the adjustment shown in the accompanying drawings, in which a pipe-section and faucet are illustrated by dotted lines, the two end clamps are arranged in line with each other to receive the straight portion of the pipe, while the intermediate clamp of the set is arranged at one side of and about or nearly midway between the end brackets. It is obvious that the brackets can be adjusted in many different positions, owing to the number and arrangement of slots in the base-board, to accommodate the various angles or bends in the pipe. After the brackets have been adjusted they are fastened in place on the base-board by a simple turn of the clamp-lever on each bracket, and the vertically-adjustable clamp of each bracket is elevated, so that the pipe can be placed in the V-shaped jaws of the pipe-rests, after which the clamps are lowered and fastened in place and the adjusting-screws are turned down to force the binding-plates firmly on the work.

By means of this device the pipe is firmly and securely held in place and prevented from getting out of alignment while the operation of "wiping" the joints or other work is being performed thereon, and thereby avoid damage to the pipe and the waste of material, and the pipe can be easily and quickly secured in or removed from the device.

The invention is easily carried or transported, as it is extremely light, and it is also very simple and durable in construction, not liable to get out of order, and cheap of manufacture.

I do not restrict myself to the exact details of construction and form and proportion of parts herein shown and described as an embodiment of my invention, as I am aware that numerous changes therein can be made without departing from the spirit or sacrificing the advantages of my invention.

I attach importance to the vertically-adjustable pipe-rests on the set of brackets, which pipe-rests can be quickly and easily adjusted at the same elevation with respect to each other, whereby pipes of different diameters can be accommodated and held in line by the brackets, which serve to hold the pipes in a firmly fixed or stationary position.

Having thus fully described my invention, what I claim as new, and desire to secure by Letters Patent, is—

1. A plumber's universal adjustable bracket consisting, essentially, of a common base-board and a set of brackets adjustable on said base-board both longitudinally and transversely thereof, substantially as and for the purpose described.

2. A plumber's universal adjustable bracket comprising a horizontal base-board and a set of brackets adjustable longitudinally and transversely on the base-board, each bracket having means for clamping the same in a fixed position on the base-board, and with a clamp for holding the work, substantially as and for the purpose described.

3. A plumber's universal adjustable bracket comprising a base-board and a set of brackets adjustable longitudinally and transversely thereon, each bracket having a pipe-rest and an adjustable clamp arranged to hold the work between itself and the pipe-rest, substantially as and for the purpose described.

4. A plumber's universal adjustable bracket comprising a base-board having the longitudinal and transverse slots and a set of adjustable brackets, each having a vertical bolt which passes through one of the slots, and a clamp-lever pivoted on the bolt and having a cam-surface arranged to lift the bolt when said lever is turned to one position, substantially as and for the purpose described.

5. A plumber's universal adjustable bracket comprising a slotted base-board and a set of adjustable brackets, each having a slotted base, a headed bolt passing through said base of each bracket and one of the slots in the base-board, and a clamp-lever fitted on the bolt and having a cam-surface which rides against a corresponding surface on the base of the bracket when the lever is turned into a position parallel with the base, substantially as and for the purpose described.

6. A plumber's universal adjustable bracket comprising a horizontal base-board and a set of adjustable brackets, each bracket having a vertically-adjustable pipe-rest and an adjustable clamp which overhangs the pipe-rest, substantially as and for the purpose described.

7. A plumber's universal adjustable bracket comprising a horizontal base-board and a set of adjustable brackets, each bracket having a pipe-rest formed with a rigid V-shaped jaw, and a clamp which overhangs the jaw of said pipe-rest, substantially as and for the purpose described.

8. A plumber's universal adjustable bracket comprising a horizontal base-board and a set of adjustable brackets, each bracket having its shank or standard provided with two ways, a vertically-slotted pipe-rest fitted in one of the ways and having a rigid jaw, a vertically-slotted clamp fitted in the other way, and thumb-screws for holding the pipe-rest and clamp at any desired vertical adjustment on the bracket, substantially as and for the purpose described.

9. A plumber's universal adjustable bracket comprising a horizontal base-board and a set of adjustable brackets, each bracket having a pipe-rest provided with a rigid jaw, a clamp having an overhanging end, and an adjusting-screw fitted in the overhanging end of the clamp and carrying a binding-plate arranged to contact with the work fitted in the jaw, substantially as described.

In testimony whereof I affix my signature in presence of two witnesses.

PERRY E. HALL, SR.

Witnesses:
T. E. HOYT,
J. F. MUNSELL.